US012610312B2

(12) United States Patent
Hau et al.

(10) Patent No.: US 12,610,312 B2
(45) Date of Patent: Apr. 21, 2026

(54) METHOD AND AN APPARATUS TO ACQUIRE VOICE SERVICES IN 5G SA DEPLOYMENT

(71) Applicant: Samsung Electronics Co., Ltd., Suwon-si (KR)

(72) Inventors: Truong Van Hau, Suwon-si (KR); Nguyen Van Khanh, Suwon-si (KR); Nguyen Van Thinh, Suwon-si (KR); Nguyen The Thoi, Suwon-si (KR); Nguyen Trung Hieu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 423 days.

(21) Appl. No.: 18/170,178

(22) Filed: Feb. 16, 2023

(65) Prior Publication Data

US 2023/0262597 A1 Aug. 17, 2023

Related U.S. Application Data

(63) Continuation of application No. PCT/KR2023/002108, filed on Feb. 14, 2023.

(30) Foreign Application Priority Data

Feb. 16, 2022 (KR) ........................ 10-2022-0019925

(51) Int. Cl.
*H04W 48/20* (2009.01)
*H04W 60/04* (2009.01)
*H04W 84/04* (2009.01)

(52) U.S. Cl.
CPC ........... *H04W 48/20* (2013.01); *H04W 60/04* (2013.01); *H04W 84/042* (2013.01)

(58) Field of Classification Search
CPC ... H04W 48/20; H04W 60/04; H04W 84/042; H04W 48/02; H04W 48/16; H04W 48/18; H04W 88/06
See application file for complete search history.

(56) References Cited

U.S. PATENT DOCUMENTS 8,600,434 B2 12/2013 Han
11,582,668 B1 * 2/2023 Thantharate .......... H04W 48/18
(Continued)

FOREIGN PATENT DOCUMENTS

CN 106341803 A 1/2017
CN 110234141 A 9/2019
(Continued)

OTHER PUBLICATIONS

3rd Generation Partnership Project; Technical Specification Group Services and System Aspects; System architecture for the 5G System (5GS); Stage 2 (Release 16), 3GPP TS 23.501 V16.8.0, Mar. 2021.
(Continued)

*Primary Examiner* — Steven Hieu D Nguyen
(74) *Attorney, Agent, or Firm* — Jefferson IP Law, LLP

(57) ABSTRACT

A method performed by a terminal in a wireless communication system is provided. The method includes identifying that long term evolution (LTE) radio access technology (RAT) of the terminal is disabled, determining whether each of the terminal and a target network supports voice communication over new radio (VoNR) before searching a NR cell, searching the NR cell in case that the terminal and the target network support the VoNR, determining whether the NR cell supports the VoNR before registration to the NR cell, and selecting a RAT other than the LTE RAT and a NR RAT to obtain a voice service in case that the NR cell does not support the VoNR.

18 Claims, 13 Drawing Sheets

(56)                    References Cited

U.S. PATENT DOCUMENTS

| | | | |
|---|---|---|---|
| 2012/0034913 A1 | 2/2012 | Wang et al. | |
| 2015/0078337 A1 | 3/2015 | Kim | |
| 2015/0358477 A1 | 12/2015 | Jeong et al. | |
| 2016/0128004 A1 | 5/2016 | Lee et al. | |
| 2017/0048920 A1* | 2/2017 | Kim | H04W 48/16 |
| 2019/0394688 A1 | 12/2019 | Zhu et al. | |
| 2020/0100309 A1 | 3/2020 | Jha et al. | |
| 2020/0252849 A1 | 8/2020 | Tang | |
| 2021/0029593 A1* | 1/2021 | Tsai | H04W 36/00226 |
| 2021/0105691 A1* | 4/2021 | Zhu | H04L 65/1016 |
| 2021/0127314 A1 | 4/2021 | Mukherjee et al. | |
| 2022/0248256 A1* | 8/2022 | Lee | H04W 28/0268 |
| 2023/0037839 A1* | 2/2023 | Gupta | H04W 76/27 |

FOREIGN PATENT DOCUMENTS

| | | |
|---|---|---|
| KR | 10-2013-0018827 A | 2/2013 |
| KR | 10-2015-0014834 A | 2/2015 |
| KR | 10-2015-0032091 A | 3/2015 |
| KR | 10-2016-0029014 A | 3/2016 |
| KR | 10-1676306 B1 | 11/2016 |

OTHER PUBLICATIONS

3rd Generation Partnership Project; Technical Specification Group Core Network and Terminals; Non-Access-Stratum (NAS) protocol for 5G System (5GS); Stage 3; (Release 17), 3GPP TS 24.501 V17.2.1, Apr. 2021.

3rd Generation Partnership Project; Technical Specification Group Core Network and Terminals; Non-Access-Stratum (NAS) protocol for Evolved Packet System (EPS); Stage 3 (Release 17), 3GPP TS 24.301 V17.3.0, Jun. 2021.

International Search Report dated May 17, 2022, issued in International Patent Application No. PCT/KR2023/002108.

\* cited by examiner

FIG. 7A

| List NR SA cell doesn't support VONR | | | | |
|---|---|---|---|---|
| 1 | PLMN | CellID | TAC | Count |
| 2 | 52505 | 0x1f80ec3ea | 0x00157e | 5 |
| 3 | 52505 | 0x1f80ec3ea | 0x00157f | 2 |
| .. | | | | |

METHOD AND AN APPARATUS TO ACQUIRE VOICE SERVICES IN 5G SA DEPLOYMENT

CROSS-REFERENCE TO RELATED APPLICATION(S)

This application is a continuation application, claiming priority under § 365(c), of an International application No. PCT/KR2023/002108, filed on Feb. 14, 2023, which is based on and claims the benefit of a Korean patent application number 10-2022-0019925, filed on Feb. 16, 2022, in the Korean Intellectual Property Office, the disclosure of which is incorporated by reference herein in its entirety.

BACKGROUND

1. Field

The disclosure relates to a wireless communication system. More particularly, the disclosure relates to a method and an apparatus for acquiring voice services in the wireless communication system.

2. Description of Related Art

Fifth generation (5G) mobile communication technologies define broad frequency bands such that high transmission rates and new services are possible, and can be implemented in "sub 6 gigahertz (GHz)" bands, such as 3.5 GHz, and also in "above 6 GHz" bands, such as millimeter wave (mmWave) including 28 GHz and 39 GHz. In addition, implementation of 6th generation (6G) mobile communication technologies (referred to as "beyond 5G systems") in terahertz bands (e.g., 95 GHz to 3 terahertz (THz) bands) has been considered for providing transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra-reliable low latency communications (URLLC), and massive machine-type communications (mMTC), there has been ongoing standardization regarding beamforming and massive multi-input multi-output (MIMO) for mitigating radio-wave path loss and increasing radio-wave transmission distances in mmWave, supporting numerologies (e.g., operating multiple subcarrier spacings (SCSs)) for efficiently utilizing mmWave resources and dynamic operation of slot formats, initial access technologies for supporting multi-beam transmission and broadbands, definition and operation of bandwidth part (BWP), new channel coding methods, such as a low density parity check (LDPC) code for large amount of data transmission and a polar code for highly reliable transmission of control information, layer 2 (L2) pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies, such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, new radio user equipment (NR UE) power saving, non-terrestrial network (NTN), which is UE-satellite direct communication for providing coverage in an area in which communication with terrestrial networks is unavailable, and positioning.

Moreover, there has been ongoing standardization in air interface architecture/protocol regarding technologies, such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access (RA) for simplifying RA procedures (e.g., 2-step random access channel (RACH) for NR). There also has been ongoing standardization in system architecture/service regarding a 5G baseline architecture (e.g., service-based architecture or service-based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be implemented. To this end, new research is scheduled in connection with extended reality (XR) for efficiently supporting augmented reality (AR), virtual reality (VR), mixed reality (MR) or the like, 5G performance improvement and complexity reduction by utilizing artificial Intelligence (AI) and machine learning (ML), AI service support, metaverse service support, and drone communication.

Further, such development of 5G mobile communication systems will serve as a basis for developing new waveforms for providing coverage in terahertz bands of 6G mobile communication technologies, multi-antenna transmission technologies, such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), as well as full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for acquiring a voice service in a wireless communication system.

Additional aspects will be set forth in part in the description which follows and, in part, will be apparent from the description, or may be learned by practice of the presented embodiments.

In accordance with an aspect of the disclosure, a method performed by a terminal in a wireless communication system is provided. The method includes identifying that LTE RAT of the terminal is disabled, determining whether each of the terminal and a target network supports voice communication over new radio (VoNR) before searching a NR cell, searching the NR cell in case that the terminal and the target network support the VoNR, determining whether the NR cell supports the VoNR before registration to the NR cell, and selecting a RAT other than the LTE RAT and a NR RAT to obtain a voice service in case that the NR cell does not support the VoNR.

In accordance with another aspect of the disclosure, a terminal in a wireless communication system is provided. The terminal includes a transceiver to transmit and receive signals, and at least one processor configured to identify that LTE RAT of the terminal is disabled, determine whether each of the terminal and a target network supports VoNR before searching a NR cell, search the NR cell in case that the terminal and the target network support the VoNR, determine whether the NR cell supports the VoNR before registration to the NR cell, and select a RAT other than the LTE RAT and a NR RAT to obtain a voice service in case that the NR cell does not support the VoNR.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7A illustrates a cell blacklist structure for a post-check step according to an embodiment of the disclosure;

Throughout the drawings, like reference numerals will be understood to refer to like parts, components, and structures.

DETAILED DESCRIPTION

Figure 1:
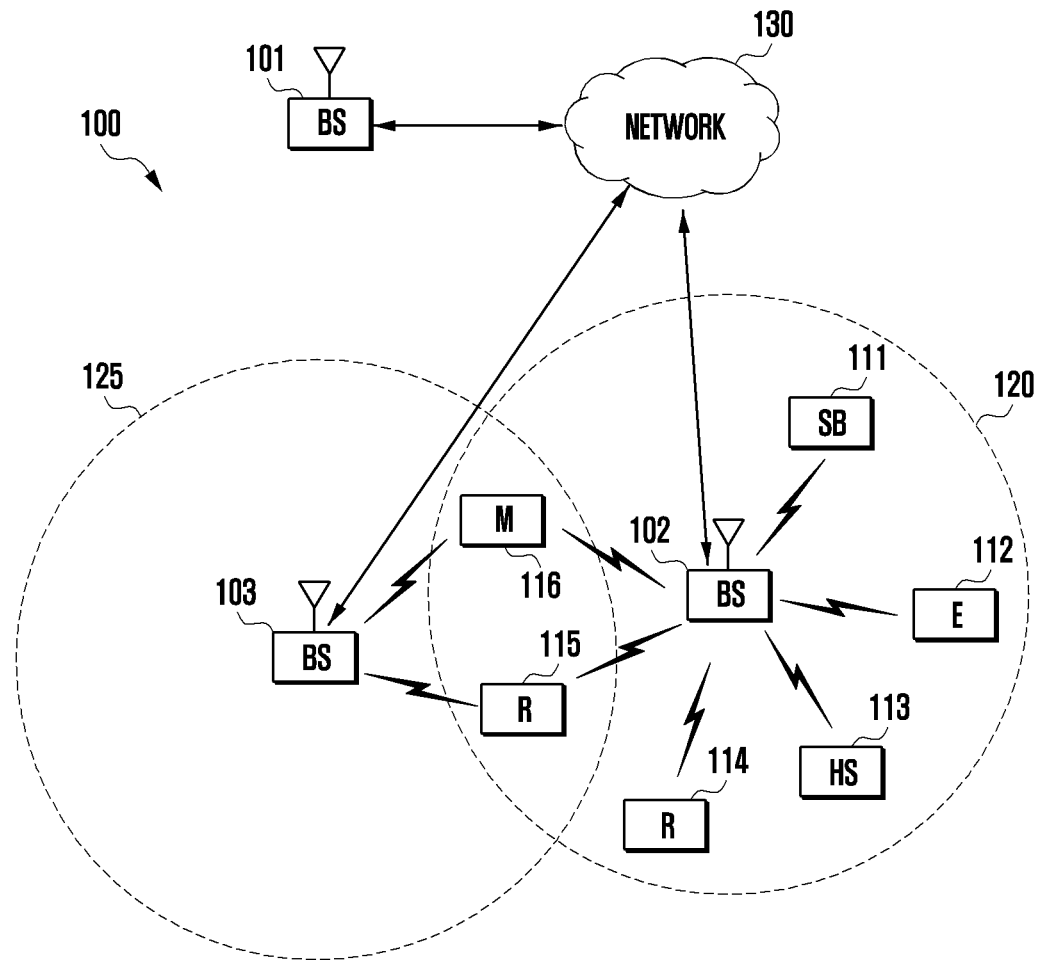
FIG. 1 illustrates a wireless network according to an embodiment of the disclosure.

The following description with reference to the accompanying drawings is provided to assist in a comprehensive understanding of various embodiments of the disclosure as defined by the claims and their equivalents. It includes various specific details to assist understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Before undertaking the DETAILED DESCRIPTION below, it may be advantageous to set forth definitions of certain words and phrases used throughout this disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, or C" includes any of the following combinations: A, B, C, A and B, A and C, B and C, and A and B and C.

Unless otherwise defined, the technical or scientific terms used in the disclosure shall have the ordinary meanings understood by those having ordinary skills in the field to which the disclosure belongs. The terms "first," "second," and the like used in this disclosure do not indicate any order, quantity, or importance, but are only used to distinguish different components. Similarly, "a," "an," or "the" and the like do not indicate a limit on quantity, but rather indicate that there is at least one. Words, such as "including" or "comprising" mean that the element or item appearing before the word encompasses the element or item appearing after the word and the equivalent thereof without excluding other elements or items. Words, such as "connected" or "interconnected" are not limited to physical or mechanical connections, but may include electrical connections, whether direct or indirect. "Upper," "lower," "left," "right," or the like, are only used to indicate the relative positional relationship, and in a case where the absolute position of the object to be described is changed, the relative positional relationship may also be changed accordingly.

Here, it will be understood that a flowchart or a combination of blocks in a process flowchart may be executed by computer program instructions. These computer program instructions can be loaded into a processor of a general purpose computer, special purpose computer, or another programmable data processing device, so the instructions executed by a computer or a processor of another programmable data processing device are created for execution unit of functions described in flowchart block(s). Computer program instructions may be stored in a computer-usable or computer-readable memory capable of directing a computer or another programmable data processing device to perform a function in a particular way, and therefore, instructions stored in the computer-usable or computer-readable memory can also produce manufacturing items that contain instruction units for performing the functions described in the flowchart block. Computer program instructions may also be loaded into a computer or another programmable data processing device, and therefore, in a case where a series of operations are performed in the computer or the other programmable data processing device, instructions of the computer or the other programmable data processing device operated by generating a process performed by the computer can provide operations for performing the functions described in the flowchart block.

In addition, each block may represent module, segment, or portion of code, where the module, segment, or code includes one or more executable instructions for performing specified logical function(s). It should also be noted that in some alternative implementations, the functions mentioned in the block may not appear in order. For example, two blocks shown in sequence may in fact be executed concurrently, or the blocks may sometimes be executed in a reverse order according to corresponding functions.

The term "unit" in an embodiment of the disclosure means a software component or a hardware component (such as a field programmable gate array (FPGA) or an application specific integrated circuit (ASIC)) that performs a specific function. However, the term "unit" is not limited to software or hardware. A "unit" may be formed to be in an addressable storage medium or may be formed to operate one or more processors. Thus, for example, the term "unit" may refer to components, such as software components, object-oriented software components, class components, and task components, and may include procedures, functions, properties, programs, subroutines, program code segments, drivers, firmware, microcode, circuits, data, databases, data structures, tables, arrays, or variables. The functions provided by components and "units" can be associated with fewer components and "units," or can be divided into additional components and "units." In addition, components and "units" may be embodied as reproducing one or more central processing units (CPUs) in a device or a secure multimedia card. Furthermore, in embodiments of the disclosure, a "unit" may include at least one processor.

In the description of the disclosure, when it is considered that some detailed explanations about functions or configurations may unnecessarily obscure the essence of the disclosure, these detailed explanations will be omitted. All terms (including descriptive or technical terms) used herein should be interpreted as having apparent meanings to those of ordinary skill in the art. However, these terms may have different meanings according to the intention of those of ordinary skill in the art, precedents or the emergence of new technologies, and therefore, the terms used herein must be defined based on the meanings of these terms together with the description throughout the specification.

Hereinafter, for example, the base station may be at least one of a next generation Node B (gNode B or gNB), an evolved Node B (eNode B or eNB), a Node B, a radio access unit, a base station controller, or a node on a network. The terminal may include a user equipment (UE), a mobile station (MS), a mobile phone, a smart phone, a computer or multimedia system capable of performing communication functions. In some implementations of the disclosure, the downlink (DL) is a wireless transmission path through which signals are transmitted from a base station to a terminal, and the uplink (UL) is a wireless transmission path through which signals are transmitted from a terminal to a base station. In addition, one or more embodiments of the disclosure may be applied to 5G wireless communication technologies (new radio (NR)) developed after long term evolution advanced (LTE-A), or to new wireless communication technologies proposed based on fourth generation (4G) or 5G (for example, Beyond 5G (B5G) or 6G).

Aspects of the disclosure are to address at least the above-mentioned problems and/or disadvantages and to provide at least the advantages described below. Accordingly, the disclosure relates to a method and an apparatus for acquiring a voice service in a wireless communication system.

Specifically, the disclosure provides a method for selecting an available radio access technology (RAT) or a roaming network to process a voice service when evolved packet system (EPS) fallback is supported in a 5G standalone (SA) deployment environment but LTE RAT of a voice-centric terminal is disabled.

In addition, the disclosure provides a method for providing an emergency call service when EPS fallback is supported in a 5G SA deployment environment but LTE RAT of the voice-centric terminal is disabled.

In addition, the disclosure provides a method of processing an additional voice service when EPS fallback is supported in a 5G SA deployment environment, but LTE RAT of the voice-centric terminal is disabled.

Figure 2:
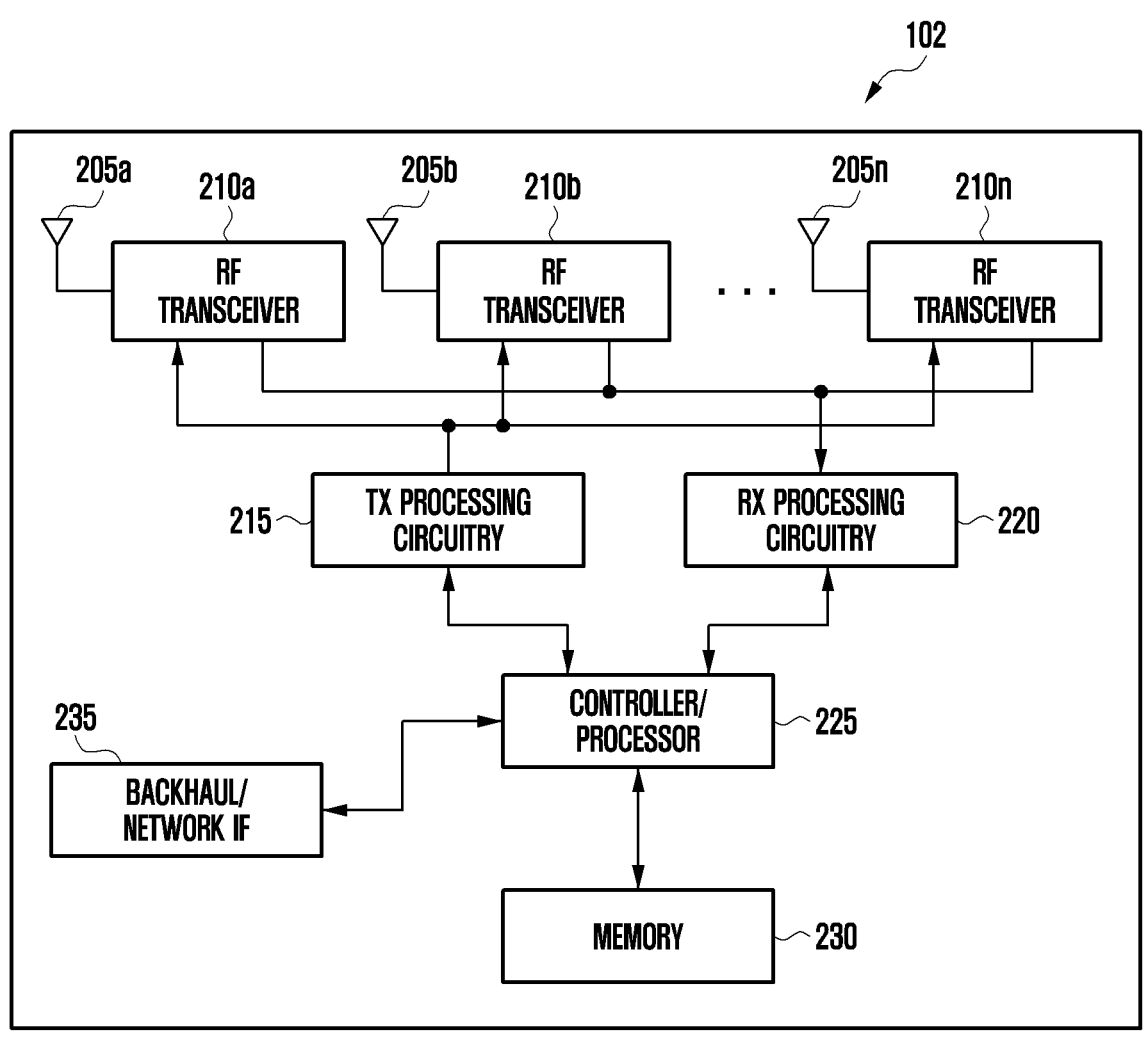
FIG. 2 illustrates a base station (BS) according to an embodiment of the disclosure.
Figure 3:
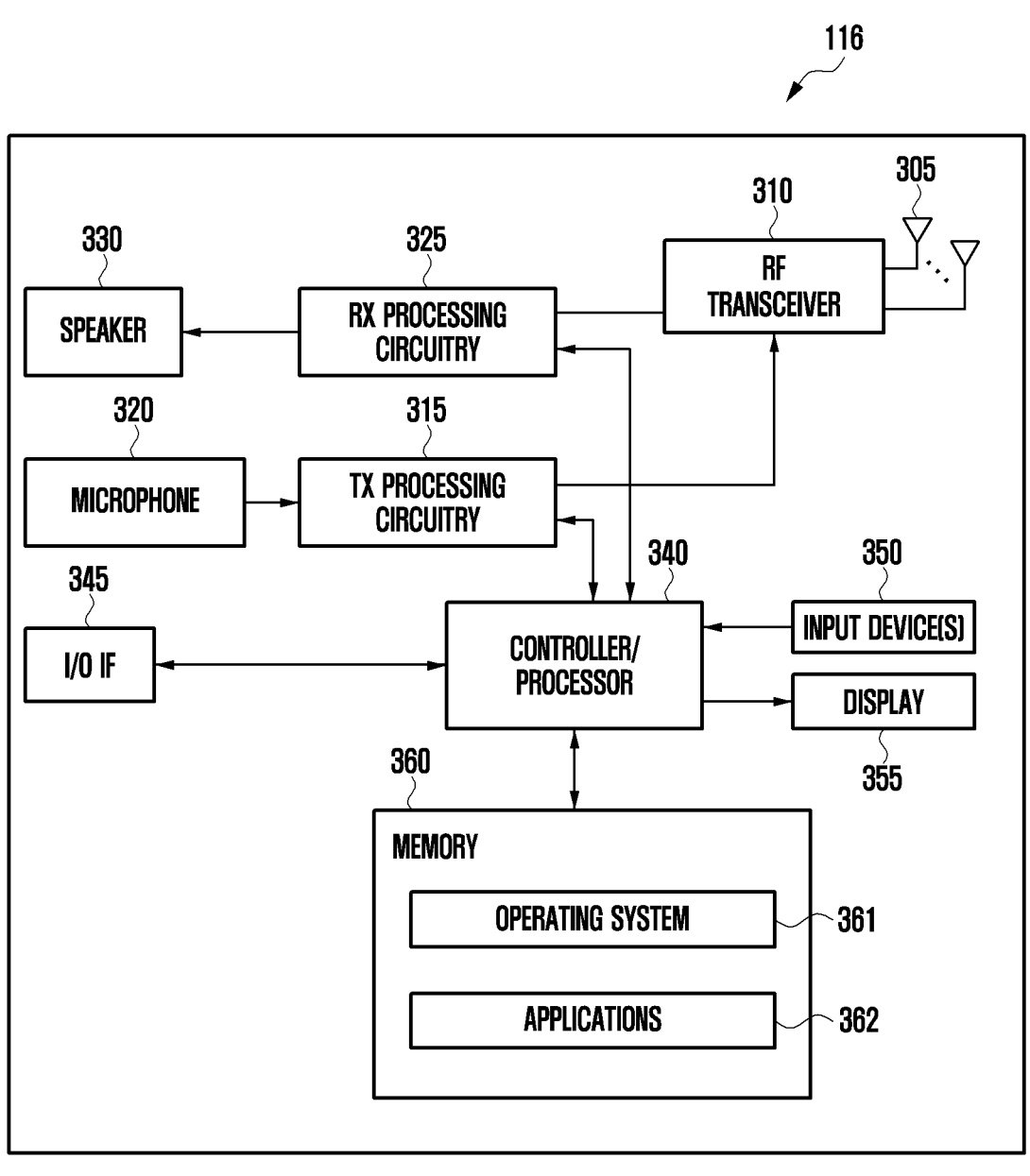
FIG. 3 illustrates a user equipment (UE) according to an embodiment of the disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the disclosure may be implemented in any suitably-arranged communications system.

FIG. 1 illustrates a wireless network according to an embodiment of the disclosure. The embodiment of the wireless network 100 shown in FIG. 1 is for illustration only. Other embodiments of the wireless network 100 can be used without departing from the scope of the disclosure.

Referring to FIG. 1, the wireless network 100 includes a BS (e.g., gNB) 101, a BS 102, and a BS 103. BS 101 communicates with BS 102 and BS 103. BS 101 also communicates with at least one network 130, such as the Internet, a private IP network, or other data networks.

Depending on a type of the network, the term "base station" or "BS" refers to a component (or set of components) configured to provide wireless access to a network, e.g., a transmit point (TP), a transmit-receive point (TRP), an enhanced base station (eNodeB or eNB), 5G/NR base station (gNB), macrocell, femtocell, wireless fidelity (WiFi) access point (AP) or other wireless capable device. The base station may provide wireless access according to one or more wireless communication protocols, such as 5G/NR 3GPP new radio interface/access (NR), LTE, LTE-A, high speed packet access (HSPA), Wi-Fi 802.11 a/b/g/n/ac and the like. For convenience, the terms "BS" and "TRP" are used interchangeably in this disclosure to denote a network infrastructure that provides wireless access to a remote terminal.

And, depending on the type of the network, the term "user terminal" or "UE" can refer to a component, such as "mobile station," "user station," "remote terminal," "wireless terminal," or "user apparatus." For convenience, the terms "user equipment" and "UE" are used in this disclosure to refer to remote wireless devices that wirelessly access the BS, no matter whether the UE is a mobile device (such as a mobile phone or a smart phone) or a fixed device (such as a desktop computer or a vending machine).

BS 102 provides wireless broadband access to the at least one network 130 for a first plurality of User Equipments (UEs) within a coverage area 120 of BS 102. The first plurality of UEs include a UE 111, which may be located in a Small Business (SB), a UE 112, which may be located in an enterprise (E), a UE 113, which may be located in a WiFi Hotspot (HS), a UE 114, which may be located in a first residence (R), a UE 115, which may be located in a second residence (R), a UE 116, which may be a mobile device (M), such as a cellular phone, a wireless laptop computer, a wireless PDA, or the like. BS 103 provides wireless broadband access to the at least one network 130 for a second plurality of UEs within a coverage area 125 of BS 103. The second plurality of UEs include a UE 115 and a UE 116. In some examples, one or more of BSs 101-103 can communicate with each other and with UEs 111-116 using 5G, LTE, LTE-A, worldwide interoperability for microwave access (WiMAX), WiFi, or other advanced wireless communication technologies.

The dashed lines show approximate ranges of the coverage areas 120 and 125, and the ranges are shown as approximate circles merely for illustration and explanation purposes. It should be clearly understood that the coverage areas associated with the BSs, such as the coverage areas 120 and 125, may have other shapes, including irregular shapes, depending on configurations of the BSs and changes in the radio environment associated with natural obstacles and man-made obstacles.

Although FIG. 1 illustrates an example of the wireless network 100, various changes can be made to FIG. 1. The wireless network 100 can include any number of BSs and any number of UEs in any suitable arrangement, for example. Furthermore, BS 101 can directly communicate with any number of UEs and provide wireless broadband access to the at least one network 130 for those UEs. Similarly, each BS 102-103 can directly communicate with the at least one network 130 and provide direct wireless broadband access to the at least one network 130 for the UEs. In addition, BS 101, 102 and/or 103 can provide access to other or additional external networks, such as external telephone networks or other types of data networks.

FIG. 2 illustrates a BS according to an embodiment of the disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

Referring to FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. Any of a wide variety of other functions could be supported in the BS 102 by the controller/processor 225. In some embodiments of the disclosure, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). In addition, various components in FIG. 2 could be combined, further subdivided, or omitted and additional components could be added according to particular needs.

FIG. 3 illustrates a UE according to an embodiment of the disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

Referring to FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The controller/processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments of the disclosure, the controller/processor 340 includes at least one microprocessor or microcontroller.

The controller/processor 340 is also capable of executing other processes and programs resident in the memory 360, such as processes for beam management. The controller/processor 340 can move data into or out of the memory 360 as required by an executing process. In some embodiments of the disclosure, the controller/processor 340 is configured to execute the applications 362 based on the OS 361 or in response to signals received from BSs or an operator. The controller/processor 340 is also coupled to the I/O interface 345, which provides the UE 116 with the ability to connect to other devices, such as laptop computers and handheld computers. The I/O interface 345 is the communication path between these accessories and the controller/processor 340.

The controller/processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The controller/processor 340 is also coupled to the display 355. The display 355 may be a liquid crystal display, light emitting diode display, or other display capable of rendering text and/or at least limited graphics, such as from web sites.

The memory 360 is coupled to the controller/processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the controller/processor 340 could be divided into multiple processors, such as one or more central processing units (CPUs) and one or more graphics processing units (GPUs). In addition, while FIG. 3 illustrates the UE 116 configured as a mobile telephone or smartphone, UEs could be configured to operate as other types of mobile or stationary devices.

Supporting voice services is always important for any radio access network (RAN). A user can initiate a voice call for conversations or an emergency service. In 5th generation (5G) communication system, there are options of voice service implementations as below:

Voice over 5G new radio (VoNR): VoNR is a standard voice service when 5G RAN is capable to support voice calls with help of 5G core (5GC) and internet protocol multimedia system (IMS).

Evolved packet system (EPS) fallback: network re-uses old systems (e.g., LTE) for the voice service. UE needs to fallback from NR SA to LTE network, for the voice service provided by 4G evolve packet core (EPC) and 4G RAN. For example, a base station triggers the UE to change the radio access from 5G NR to 4G LTE during a call establishment.

Radio access technology (RAT) fallback: UE camps on 5G NR to use a data service while falls back to LTE to initiate a voice call. When UE makes the voice call, NR network (i.e., NR base station) instructs UE to register to LTE network (i.e., LTE network) to perform the voice call.

Since the network determines a type of the voice service to be used, the terminal cannot know the type of the voice service supported by the network. The UE can only know whether the voice service is used in the current NR cell by identifying the flag "IMS voice over PS session supported indication over 3GPP access (IMS VOPS)" in a registration accept message which is set by the network. For example, after UE initiates the voice call in NR cell, the network may indicate the UE to fallback to LTE in order to be able to handle the voice call. The network may request the UE to handover from the NR cell to a specific LTE cell or to redirect to a specific LTE frequency/band. Thereafter, UE establishes an IMS call in a LTE cell or a LTE frequency/band.

In initial stage of launching NR standalone (SA), most of NR systems do not support voice services, and they prefer deploying services belong to data domain, such as URLLC, or eMBB, or the like. The voice service was provided by re-use of LTE RAN by EPS fallback. So LTE service is mandatory for these NR systems.

Figure 4:
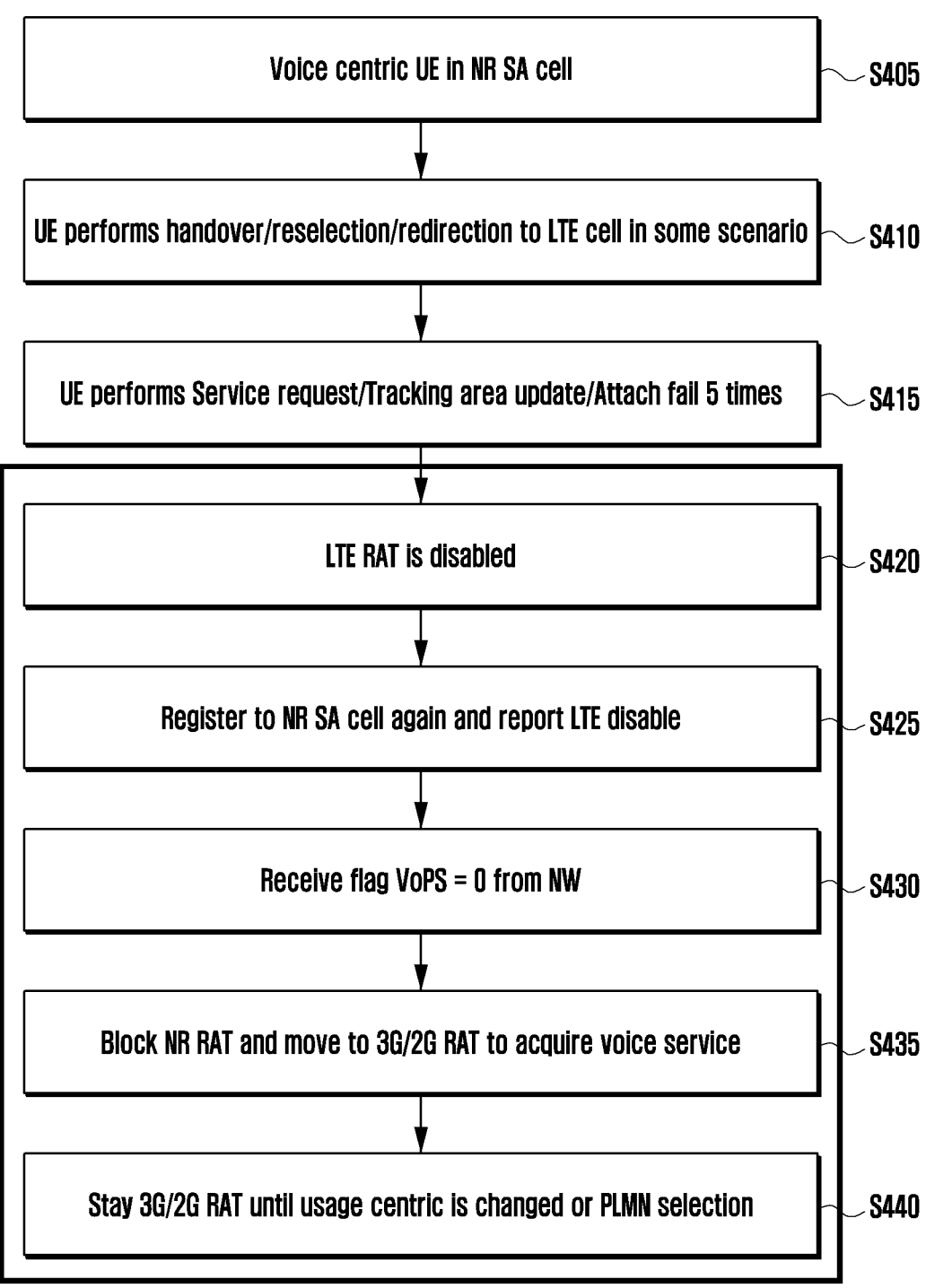
FIG. 4 illustrates a procedure for a voice call according to a current third generation partnership project (3GPP) standard according to an embodiment of the disclosure.

FIG. 4 illustrates a procedure for a voice call according to a current 3GPP standard according to an embodiment of the disclosure.

Referring to FIG. 4, the UE initiates a voice call in a NR cell at operation S405 during an establishment stage, the network indicates the UE to fallback to an LTE cell for processing the voice call. The network requests the UE to handover from the NR cell to the LTE cell or to redirect to an LTE frequency/band at operation S410. UE performs a service request procedure, a tracking area updating procedure or an attach procedure at operation S415.

The voice service may be discontinuous if there is a problem in an LTE network. One of problems in the LTE network may arise when LTE RAT is disabled at UE side. UE determines that LTE RAT is disabled at UE side based on following scenarios at operation S420 (refer to 3GPP specification TS 24.301, 5.5.1.2.6, 5.5.1.3.4.3, 5.5.1.3.6, 5.5.3.2.6, 5.5.3.3.4.3 and 5.5.3.3.6):

Weak signal condition or congestion at network side, the UE tried to transmit ATTACH REQUEST or TRACK-ING AREA UPDATE REQUEST 5 times, but it cannot be transmitted, Network releases connection due to overload or other problems at network. The network cannot handle ATTACH REQUEST or TRACKING AREA UPDATE REQUEST from the UE, Network rejects UE with abnormal cause: #22 (congestion), #25 (not authorized for CSG (Closed Subscriber Group)), #19 (ESM (EPS Session Management) failure), #95 (semantically incorrect message), #96 (invalid mandatory information), #97 (message type non-existent or not implemented), #99 (information element non-existent or not implemented) and #111 (protocol error, unspecified), ATTACH REQUEST or TRACKING AREA UPDATE REQUEST is sent, but UE doesn't receive response from network, or Some other reasons are listed up in 3GPP specification.

Before 3GPP release v16.8.0, there was no way to handle a case in which the voice service cannot be used when NR network only supports EPS fallback and LTE RAT of the UE is disabled (UE cannot receive LTE services). After 3GPP release v16.8.0, a parameter (S1 mode related setting parameter) was added to handle this case. The parameter may be included in a registration request message transmitted by the UE. When the UE registers to the NR network, the UE shall report capability for S1 mode to network. If the UE is capable of S1 mode, there is a single UE's usage setting at the UE which applies to both 5GS and EPS. If UE indicates that S1 mode is disabled at operation S425, network sets voice capability off to UE (i.e., VoPS not support) at operation S430. After receiving this indication, UE disables NR capability, then tries to get service in other available RATs, such as $3^{rd}$ generation/$2^{nd}$ generation/code division multiple access (3G/2G/CDMA) at operation S435. If LTE RAT is disabled and NR cell only supports EPS fallback, UE stays in 3G/2G cells until LTE is available again and cannot use NR services at operation S440. The above-described procedures take too long to acquire the voice service, and the NR service may be permanently disabled.

For an emergency call, the network indicates a supporting capability for an emergency voice service during a registration procedure by configuring two flags in a registration accept message. The two flags included in the registration accept message comprises (i) an emergency service support indicator for 3GPP access (EMC) indicating that the network supports a VoNR emergency service and (ii) an emergency service fallback indicator for 3GPP access (EMF) indicating that the network supports an emergency fallback. In case that the network only supports the emergency service fallback (ESFB) and LTE RAT of the UE is disabled, 3GPP allows the UE to perform an emergency call service by re-enabling the LTE RAT (3GPP TS 24.501, 4.9). For example, the UE may re-enable the LTE RAT or select to re-enable the LTE RAT to perform the ESFB, and may select LTE to handle the emergency call service in respect to the implementation of the UE. However, since the network does not clearly inform the UE when and how to re-enable the LTE RAT (or S1 mode), it is ambiguous when and how to enable the LTE RAT from the UE's point of view.

Accordingly, the disclosure provides a system and a method for acquiring a voice service in a 5G SA deployment in order to address the above issues. Specifically, the first embodiment provides a method for acquiring the voice service in an available RAT, the second embodiment provides a method for acquiring an emergency voice service when LTE is disabled, the third embodiment provides a method for acquiring the voice service in a roaming network, and the fourth embodiment provides a method for acquiring the voice service by activating an additional voice service.

First Embodiment

In the first embodiment of the disclosure, when the UE initiates selection for a NR RAT, if LTE RAT is disabled on a voice centric UE (pre-condition), instead of performing a cell search and reporting the disable state of the LTE RAT to the network, a method of determining early a VoNR support capability of the UE and changing an available RAT to obtain voice services is provided.

Figure 5:
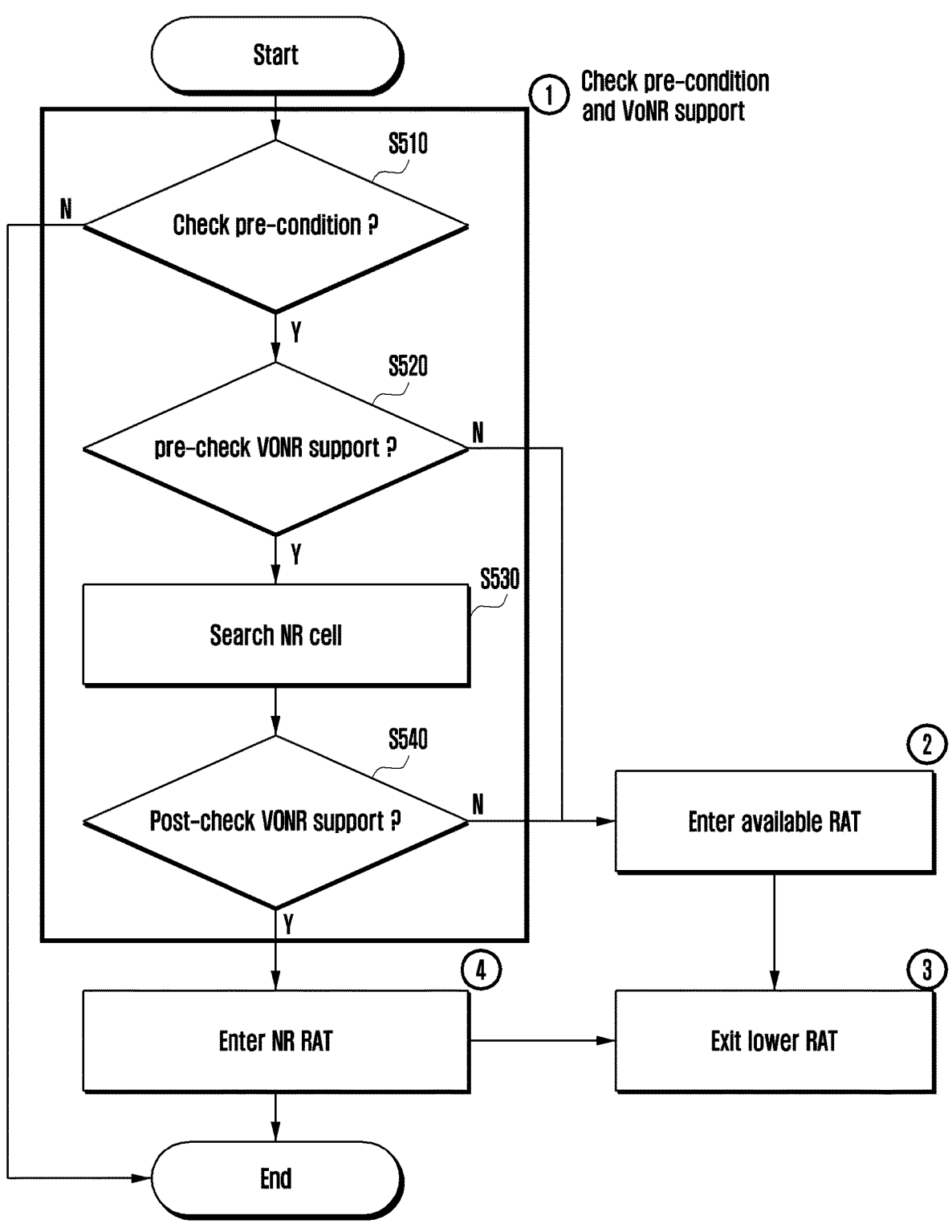
FIG. 5 illustrates a flowchart for acquiring a voice service in an available RAT according to an embodiment of the disclosure.

FIG. 5 illustrates a flowchart for acquiring a voice service in an available RAT according to an embodiment of the disclosure.

Referring to FIG. 5, a procedure for acquiring the voice service in the available RAT may comprise 4 operations: (1) operation 1: check pre-conditions and whether the VoNR is supported, (2) operation 2: enter into the available RAT, (3) operation 3: exit lower generation RAT, and (4) operation 4: enter into NR RAT. Hereinafter, each operation will be described in detail.

(1) Operation 1: Check Pre-Conditions and Whether the VoNR is Supported

UE may check a pre-condition at operation S510. The pre-condition may include at least one of (i) whether LTE RAT is disabled or (ii) a UE's usage setting. Specifically, UE may identify at least one of whether the LTE RAT is disabled or the UE's usage setting. For example, the UE may identify whether LTE RAT is disabled and the UE's usage setting.

LTE RAT may be disabled in a predetermined timer period (e.g., 12 minutes). In addition, when an attach attempt counter or a tracking area updating attempt counter of the UE reaches the maximum value (e.g., 5), the LTE RAT may be disabled. The causes of LTE RAT disability may be summarized as several causes as follows:

Weak signal condition or congestion at network side, the UE tried to transmit ATTACH REQUEST or TRACK-ING AREA UPDATE REQUEST 5 times, but it cannot be transmitted, Network releases connection due to overload or other problems at network. The network cannot handle ATTACH REQUEST or TRACKING AREA UPDATE REQUEST from the UE, Network rejects UE with abnormal cause: #22 (congestion), #25 (not authorized for CSG (Closed Subscriber Group)), #19 (ESM (EPS Session Management) failure), #95 (semantically incorrect message), #96 (invalid mandatory information), #97 (message type non-existent or not implemented), #99 (information element non-existent or not implemented) and #111 (protocol error, unspecified), or ATTACH REQUEST or TRACKING AREA UPDATE REQUEST is sent, but UE doesn't receive response from network.

UE's usage setting is defined in TS 24.301:

The UE's usage setting applies to voice capable UEs in 5GS and indicates whether the UE has preference for voice services over data services or vice-versa. Voice services include IMS voice and data services include any kind of user data transfer without a voice media component. The UE's usage setting may be set to "voice centric" or "data centric". If a UE has preference for voice services, then the UE's usage setting is configured as the "voice centric". If a UE has preference for data services, then the UE's usage setting is configured as the "data centric". A UE whose setting is "data centric" may still require access to voice services. A UE whose setting is "voice centric" may still require access to data services.

In case that the LTE RAT of the UE is disabled and the UE's usage setting is set to 'voice-centric', the UE may determine that the pre-condition is met.

When the pre-condition is met, the UE may perform a pre-check on whether VoNR is supported at operation S520.

"Pre-checking whether the VoNR is supported" may mean identifying the VoNR supporting capability of the network (e.g., base station, public land mobile network (PLMN)) based on information stored in the UE's local database, without NR cell search (that is, before NR cell search). An operator may inform the UE of the VoNR support capability information for each region, location, coverage or PLMN, and the UE may update the VoNR support capability information provided by the operator into the UE's local database.

The UE may search for a NR cell in the NR frequency/band of the target network (base station, PLMN) at operation S530, based on it being determined that the UE and the target network (e.g., base station, PLMN) support the VoNR.

The UE may perform a post-check on whether the VoNR is supported or not at operation S540. "Post checking whether the VoNR is supported" may mean identifying the VoNR support capability of a current cell (i.e., the searched cell) through:

Broadcast messages (e.g., SIB1/SIB2/MIB) for temporary blocked services (e.g., call, SMS . . . ) in the current cell, A newly defined flag indicating whether to support the VoNR in the broadcast message (e.g., SIB/MIB), and/or Monitor list of cells that do not support the VoNR generated based on a call history of the UE.

Figure 6:
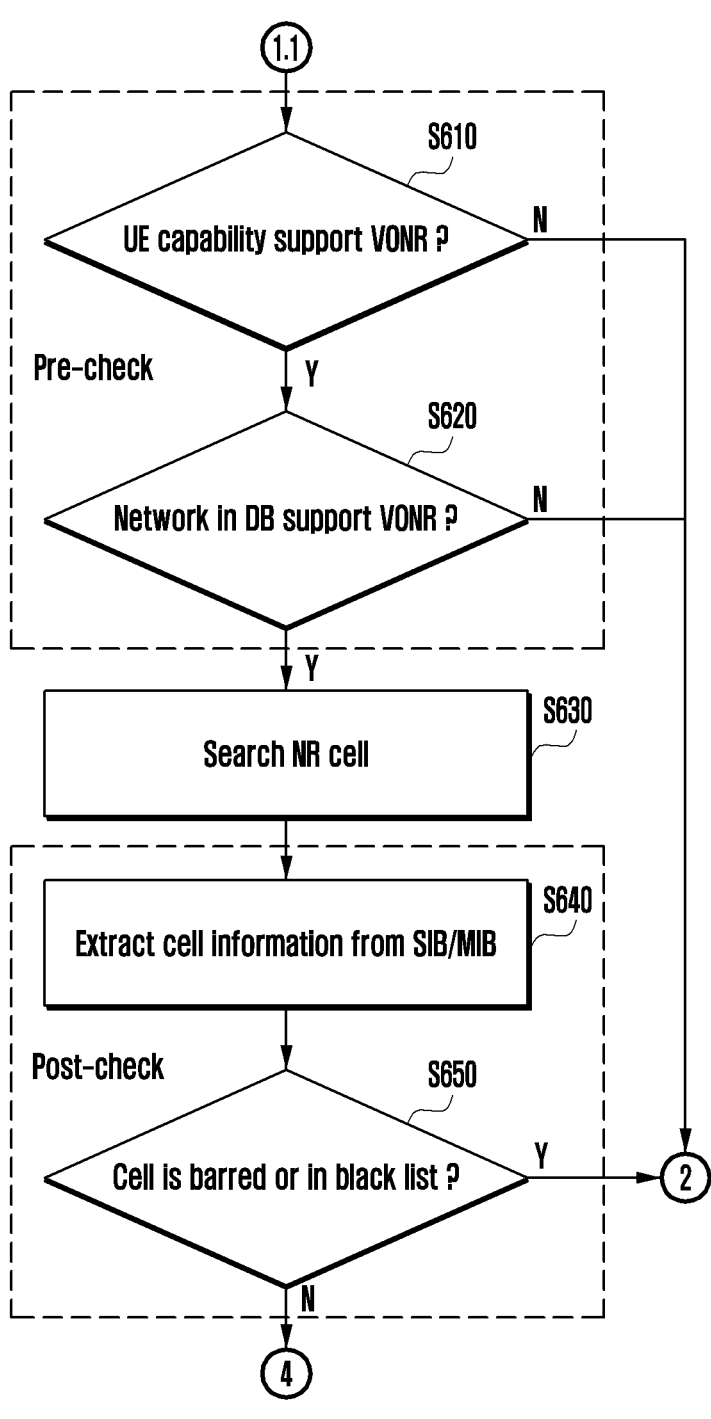
FIG. 6 illustrates a flowchart for determining a voice over 5G new radio (VoNR) support capability according to an embodiment of the disclosure.

FIG. 6 illustrates a flowchart for determining the VoNR supporting capability according to an embodiment of the disclosure.

Referring to FIG. 6, an operation of determining/identifying the VoNR supporting capability may be divided into two steps: "pre-check" step and "post-check" step. Operation 1. Operation 1 in FIG. 6 may correspond to operation S510 in FIG. 5, "pre-check" step S610, S620 in FIG. 6 may correspond to operation S520 in FIG. 5, and "post-check" step S640, S650 in FIG. 6 may correspond to operation S540 in FIG. 5.

Before cell search, the UE may perform operations of the pre-check step. Specifically, the UE may identify its VoNR supporting capability at operation S610. If the UE is capable to support the VoNR, the UE may check whether the network can support the VoNR based on information stored in the local database of the UE at operation S620. The UE may maintain and update this local database using information provided by the operator. For example, the operator may share VoNR information supported for each region, location, or PLMN with the UE. In the pre-check step, since the UE does not need to perform frequency scanning or the NR cell search (i.e., cell search is skipped), the UE can save time and power consumption required for the cell search.

After the pre-check, if it is determined that both the UE and the network support the VoNR, the UE may perform NR cell search at operation S630, but may not perform cell selection before the post-check step.

The UE may perform the post-check step in a state in which the UE does not registered to the NR cell. In the post-check step, UE may extract/obtain one or more parameters based on a broadcast message (e.g., SIB1, SIB2, and/or MIB) transmitted from the network at operation S640. The UE may obtain information on the VoNR supporting capability of the searched cell through the broadcast message and determine whether the cell is barred or is included in a blacklist (monitoring list) at operation S650.

In an embodiment of the disclosure, a new flag may be defined in the broadcast message (e.g., SIB1). The new flag may indicate whether the VoNR is supported in a cell. The UE may determine whether a current cell (i.e., the searched cell) supports the VoNR, by identifying a value of the new flag in the broadcast message (e.g., SIB1). For example, when the value of the new flag is set to 0, the UE may determine that the current cell supports the VoNR. And, when the value of the new flag is set to 1, the UE may determine that the current cell does not support the VoNR. For another example, when the value of the new flag is set to 1, the UE may determine that the current cell supports the VoNR. And, when the value of the new flag is set to 0, the UE may determine that the current cell does not support the VoNR.

In another embodiment of the disclosure, in order to determine whether the searched cell supports the VoNR, the terminal may generate a blacklist for a cell and maintain it. The blacklist may be expressed as a monitoring list. When the UE receives a broadcast message (e.g., SIB/MIB), the UE may obtain information on a PLMN (e.g., PLMN ID), cell ID, and information on tracking area code (TAC) of a cell associated with the SIB/MIB based on the broadcast message (e.g., SIB/MIB), and map them to a database of the blacklist. The UE may determine whether the current cell supports the VoNR based on the database of the blacklist.

FIG. 7A illustrates a cell blacklist structure for post-check step according to an embodiment of the disclosure.

Referring to FIG. 7A, the cell blacklist may comprise information on one or more cells that do not support the VoNR. The information in the cell blacklist may include cell ID, TAC, information on PLMN (e.g., PLMN ID) and count for each cell. For example, when a value of the count reaches to a max value n (e.g., 5), the UE may determine that corresponding cell does not support the VoNR. The max value may be pre-defined or pre-configured.

Figure 7B:
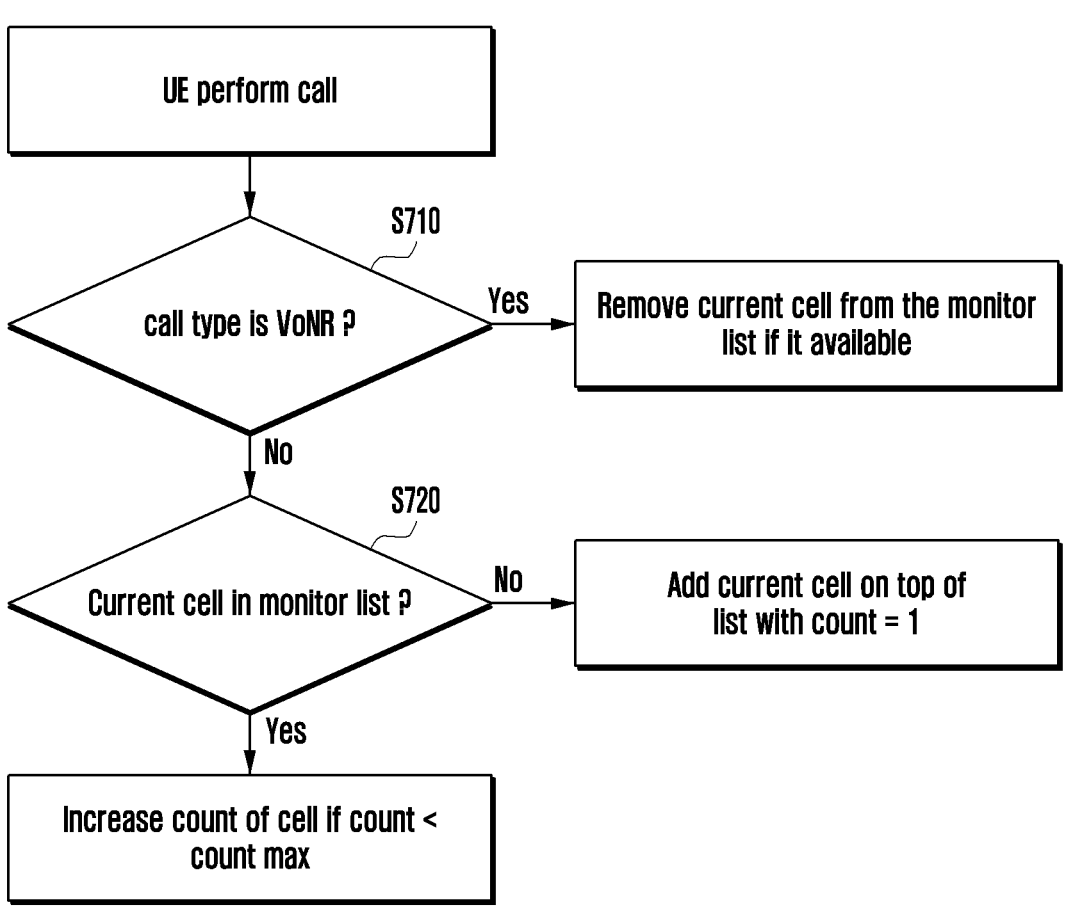
FIG. 7B illustrates a flowchart for updating a cell blacklist according to an embodiment of the disclosure.

FIG. 7B illustrates a flowchart for updating a cell blacklist according to an embodiment of the disclosure.

Referring to FIG. 7B, the terminal may identify whether the call type is the VoNR operation S710. When the call type is VoNR, the current cell may be excluded from the monitoring list.

When the call type is not the VoNR, the terminal may identify whether the current cell is included in the monitoring list at operation S720. If the current cell is not included in the monitoring list, the UE may add the current cell to the monitoring list and set the value of the count field to 1. In addition, information on the corresponding cell (e.g., cell ID, TAC, PLMN, or the like) may be added to the monitoring list. If the current cell is included in the monitoring list, the UE may increase the value of the count field of the corresponding cell by 1.

When the count value of the corresponding cell in the monitoring list reaches the maximum value, it may be determined that the corresponding cell does not support the VoNR. Otherwise (i.e., the count value has not reached the maximum value), the corresponding cell may be assumed to support the VoNR. The maximum value may be predefined or pre-configured.

In case that the LTE RAT is disabled, if it is determined that at least one of the UE or the target network does not support the VoNR, or the searched cell is barred or included in the blacklist (or the counter value of the cell included in the blacklist reaches to the maximum value), operation 2 to be described later may be performed.

In case that the LTE RAT is disabled, if the UE and the target network supports the VoNR, and the searched cell is not barred or is not included in the blacklist (or the counter value of the cell included in the blacklist does not reach the maximum value), operation 4 to be described later may be performed.

(2) Operation 2: Enter into the Available RAT

When the UE does not support the VoNR, the network does not support the VoNR, or the searched NR cell is barred or included in the blacklist (or when the counter value of the cell included in the blacklist reaches the maximum value), the UE may change to an available RAT to process the voice service.

1. Disable NR cell: UE may block NR RAT and store the current NR cell's frequency for quick return back in next time, and disable N1 mode capability. The N1 mode means a mode of a UE allowing access to the 5G core network via the 5G access network.

2. Select another RAT excluding LTE and NR RAT (e.g., 3G/2G RAT) for the voice service: The UE may use the 3G/2G frequency stored for 3G/2G that has been successfully camped before. Otherwise, a full cell search is required.

3. UE may register and camp on the available cell (e.g., 3G/2G RAT) to acquire voice services.

(3) Operation 3: Exit Lower Generation RAT

The NR RAT may be re-enabled after the LTE RAT becomes available. The UE may re-enable and search for an NR cell when detecting one of the following conditions:

LTE is re-enabled,

VoNR capability of UE and PLMN are changed,

UE's usage setting is changed from voice centric to data centric, or

UE is in no service.

After enable NR RAT, UE may use the NR frequency stored in operation 2 for PLMN search. Through this, it is possible to use the NR service as quickly as possible. A full search is required if the stored NR frequency is not available.

(4) Operation 4: Enter into the NR RAT

When the cell searched in operation 1 is determined as a cell in which the VoNR is supported or a cell capable of EPS fallback is searched in operation 3, the UE may register and camp on the searched NR cell.

Second Embodiment

Figure 8:
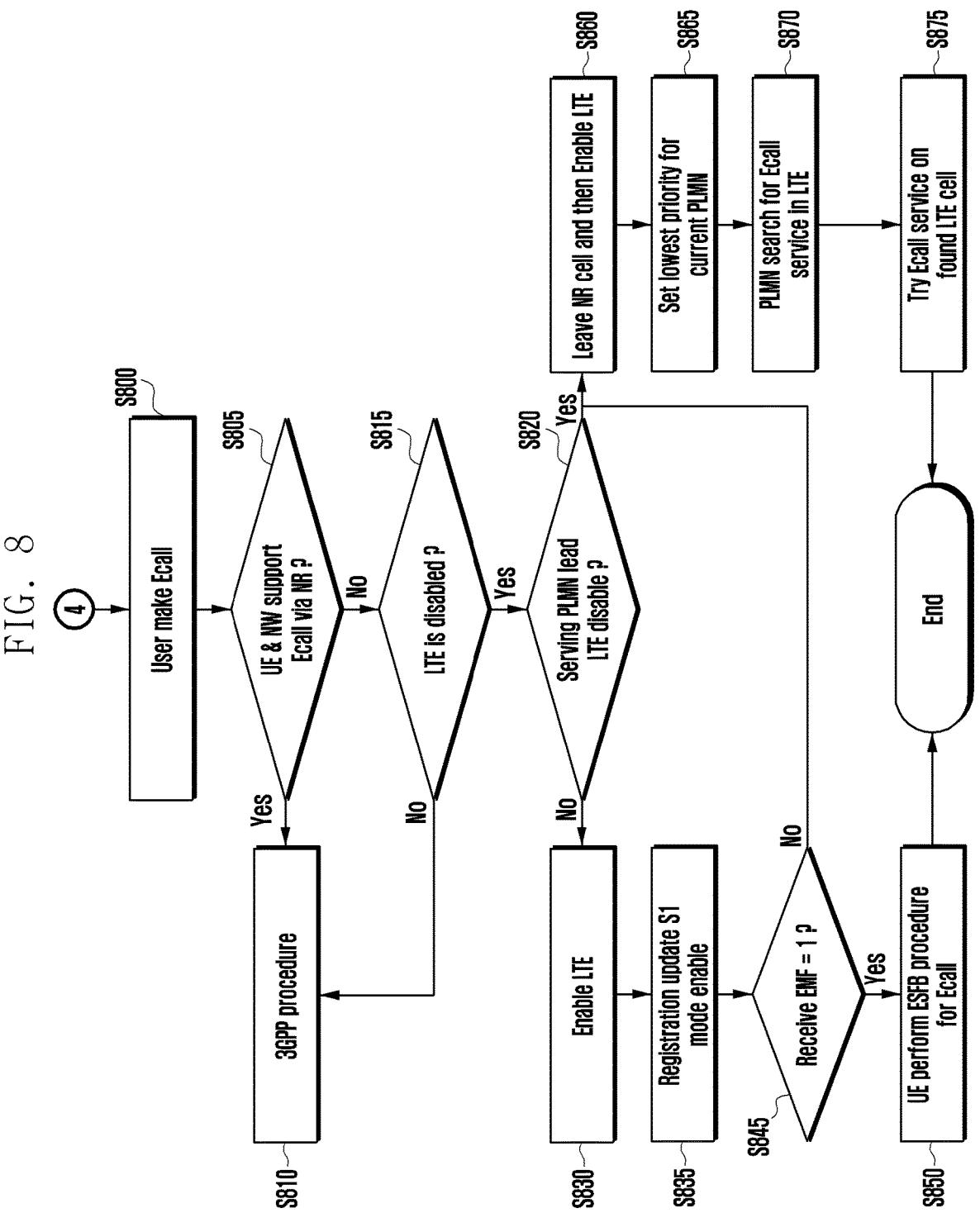
FIG. 8 illustrates a flowchart for acquiring an emergency voice service when LTE is disabled, according to an embodiment of the disclosure.

FIG. 8 illustrates a flowchart for acquiring an emergency voice service when LTE RAT of the UE is disabled according to an embodiment of the disclosure.

Referring to FIG. 8, a user may make an emergency call (Ecall) in a NR network (i.e., 5G SA cell) at operation S800.

The UE may determine (i) whether the UE supports the VoNR emergency service (e.g., Ecall) and (ii) whether the network (base station) supports the VoNR emergency service (e.g., Ecall), respectively at operation S805. For example, the UE may determine whether the target network (base station, PLMN) supports the VoNR emergency service by checking the EMC indicator included in the registration accept message received in the network registration process.

In case that at least one of the UE or the target network does not support Ecall via the NR network, the UE may determine whether the LTE RAT is disabled in a time period at operation S815. In case that at least one of the UE or the target network does support Ecall via the NR network, the UE proceeds to operation S810 for the 3GPP procedure. For example, the time period may mean a time during which a preset timer is running.

If the LTE RAT is disabled in the corresponding time period, and it is determined that either the UE or the target network does not support emergency VoNR, the UE may identify whether the serving PLMN causes the disability of LTE or not (or whether the serving PLMN memorizes that the PLMN lead LTE is disabled) at operation S820.

If the disability of the LTE is not caused by the current serving PLMN, operations S830 to S850 may be performed. Specifically, the UE may re-enable the LTE RAT at operation S830, then activate S1 mode by performing registration update at operation S835. The UE may obtain an emergency services fallback indicator for 3GPP access (EMF) at operation S845. A bit of the EMF indicates the support of emergency services fallback (ESFB) for 3GPP access. For example, the bit of the EMF is set to 1, the UE may perform the ESFB if current network still supports the ESFB at operation S850. In the ESFB procedure, the network may provide proper LTE cells to select and support quick back to NR after emergency call ends. If the bit of the EMF is set to 0, the UE may perform at operation S860.

If the current serving PLMN disables the LTE, operations S860 to S875 may be performed.

Specifically, the UE may disable the NR RAT and select the LTE RAT except for LTE-disabled PLMNs for the limited service at operation S860. The lowest priority may be set for the current serving PLMN at operation S865. The UE may search for a PLMN for the Ecall service in the LTE RAT at operation S870. The UE may use the Ecall service in another RAN of another PLMN operator that indicates support of the emergency call through a system information message at operation S875.

Third Embodiment

In the third embodiment of the disclosure, when the UE initiates selection for a NR RAT, if LTE RAT is disabled, instead of performing a cell search and reporting the disable state of the LTE RAT to the network, a method of determining a VoNR support capability for acquiring a voice service in an available roaming network and handling the voice service in the roaming network is provided.

Figure 9:
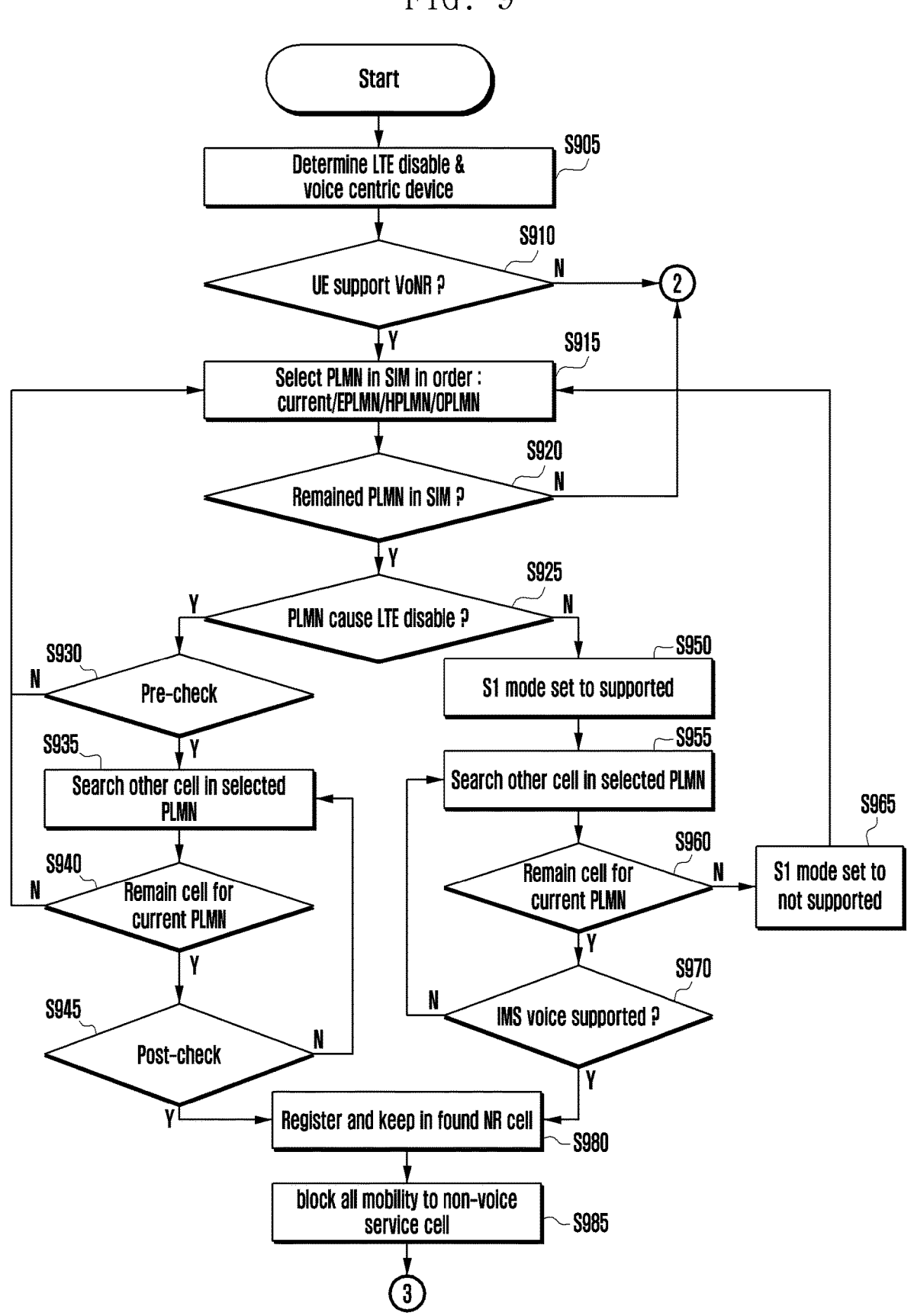
FIG. 9 illustrates a flowchart for acquiring a voice service in a roaming network according to an embodiment of the disclosure.

FIG. 9 illustrates a flowchart for acquiring a voice service in a roaming network according to an embodiment of the disclosure.

Referring to the FIG. 9, a method of finding another roaming NR cell for the voice service when there is another PLMN available in a subscriber identification module (SIM) or a local database will be described.

The UE may identify that the LTE RAT is disabled and the UE's usage setting is set to 'voice-centric' at operation S905.

The UE may determine whether to support the VoNR at operation S910. When the UE does not support the VoNR, operation 2 of FIG. 5 described above may proceed.

When the UE supports the VoNR, the UE may select a PLMN stored in the SIM at operation S915. The UE may obtain the PLMN list in the order of equivalent PLMN (EPLMN)/home PLMN (HPLMN)/operator PLMN (OPLMN) from the SIM memory module (e.g., EF (elementary file) _OPLMN, EF_EPLMN, IMSI (International Mobile Subscriber Identity) . . . ) of the local database. Alternatively, the PLMN list may be obtained based on the local database of the UE and the operator, and may be updated from the operator. And, a PLMN may be selected from the PLMN list.

If there is a PLMN remaining in the SIM at operation S920, the UE may identify whether the selected PLMN causes disabling of LTE at operation S925.

When the selected PLMN disables the LTE, operations S930 to S945 may be performed. In this case, the target cell may need to have the ability to provide the VoNR service. Specifically, the UE may perform a pre-check at operation S930. For example, through a pre-check, the UE may identify whether the selected PMLN supports the VoNR. If the selected PLMN supports the VoNR, another cell may be searched for in the selected PLMN at operation S935. In order to obtain a voice service in the network agreed with the HPLMN, the UE may find all available cells in the currently registered area. If there is a cell remaining in the current PLMN at operation 940, a post-check may be performed at operation S945.

If the selected PLMN does not cause LTE disability, operations S950 to S970 may be performed. In this case, the UE may re-enable the LTE and the target cell may only need to provide an IMS voice service (VoNR or EPS fallback). Specifically, the S1 mode may be set at operation S950. The UE may search for another cell in the selected PLMN at operation S955. In order to obtain the voice service in the network agreed with the HPLMN, the UE may find all available cells in the currently registered area. If there are no cells remaining in the current PLMN at operation S960, it may be configured that the S1 mode is not supported at operation S965. If there are cells remaining in the current PLMN at operation S960, the UE may determine whether IMS voice is supported or not at operation S970.

If the post check condition is satisfied in operation S945 or it is determined that IMS is supported in operation S970, the UE may register to the searched NR cell at operation S980.

If the HPLMN cannot provide the VoNR service, the UE may block the HPLMN recovery by a High Priority PLMN (HPPLMN) timer of the SIM or other reasons. The UE may block mobility for the NR cell that cannot provide the VoNR service at operation S985. Upon detecting one of the following conditions, the UE may unblock the mobility and restore the HPLMN: i) LTE is re-enabled, ii) VoNR capability is changed, iii) UE's usage setting is changed from voice-centric to data-centric or, iv) the UE is not in service.

Fourth Embodiment

When the UE initiates selection for a NR RAT, if LTE RAT is disabled, instead of performing a cell search and reporting the disable state of the LTE to the network, a method is provided to determine early a VoNR support capability for activating an additional voice service and to obtain the voice service based on the additional voice service. In the fourth embodiment of the disclosure, the additional voice service may mean an additional call service.

Figure 10:
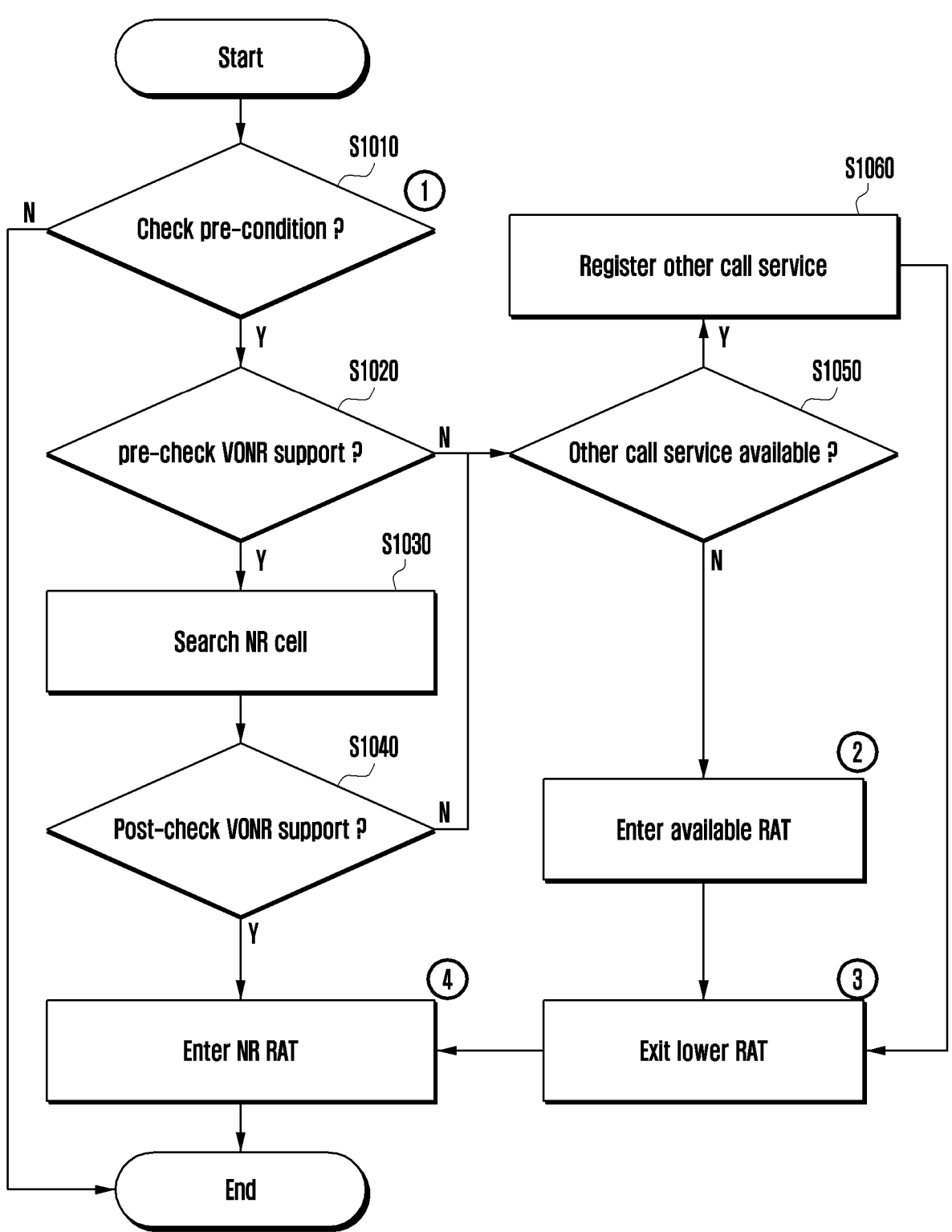
FIG. 10 illustrates a flowchart for acquiring a voice service by activating an additional voice service according to an embodiment of the disclosure.

FIG. 10 illustrates a flowchart for acquiring a voice service by activating additional voice service according to an embodiment of the disclosure.

Referring to FIG. 10, operations S1010 to S1040 may correspond to operations S510 to S540 in FIG. 5. Accordingly, redundant descriptions will be omitted, and reference may be made to the description of FIG. 5. In addition, the usage setting of the UE may be set to 'voice centric'.

In operation S1020, the UE may determine that LTE RAT is disabled and either one of the UE or the target network does not support the VoNR. In this case, the UE may identify whether additional voice service is available at operation S1050. Alternatively, when the LTE RAT is disabled in operation S1040 and the searched NR cell does not support VoNR in operation S1030, the UE may identify whether the additional voice service is available at operation S1050. If the additional voice service is available in the NR cell, the UE may register to the NR cell and obtain the additional voice service which is activated at operation S1060 in the NR cell. On the other hand, if the additional voice service is not available in the NR cell, UE may perform operation 2 in FIG. 5.

For example, the additional voice service includes at least one of voice over wireless fidelity (Vowifi) or Call and message continuity (CMC).

According to the method and/or the embodiments of the disclosure, EPS fallback is supported in a 5G SA environment, but when the UE detects that LTE is disabled or there is no LTE service, the UE can quickly determine the available RAT or other roaming networks, or the like, to obtain voice services. Through this, it is possible to reduce the time and power consumption of the UE for acquiring voice services in various situations.

In addition, the method and/or embodiments of the disclosure may be implemented in a combination of some or all of the contents included in each embodiment within a range that does not impair the essence of the disclosure. For example, the base station and the UE may be operated by combining parts of one embodiment and another embodiment of the disclosure.

The method and/or embodiments proposed in the disclosure may be implemented/performed by the apparatus described with reference to FIGS. 2 and 3 and FIGS. 11 and 12 to be described later.

Figure 11:
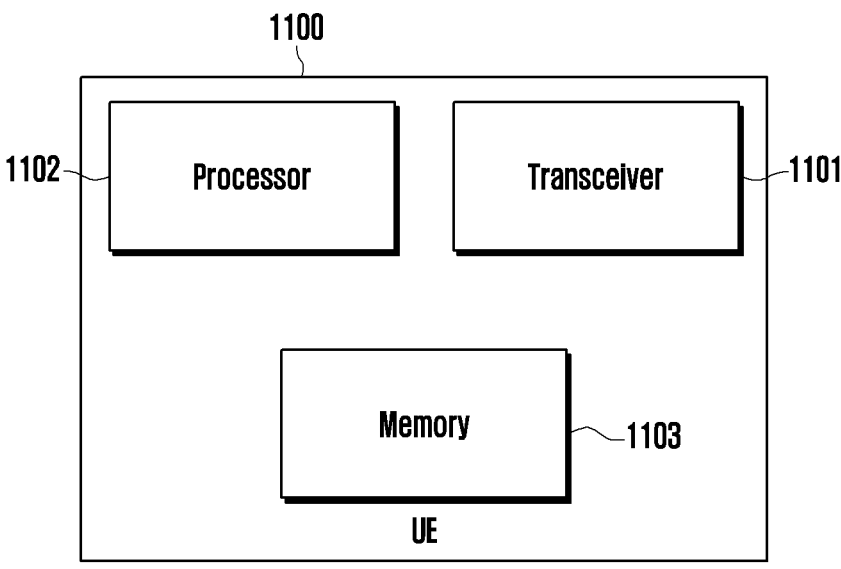
FIG. 11 illustrates a block diagram of a configuration of a UE according to an embodiment of the disclosure.

FIG. 11 illustrates a block diagram of a configuration of a UE according to an embodiment of the disclosure.

Referring to FIG. 11, a UE 1100 according to various embodiments of the disclosure may include a transceiver 1101, a processor 1102 and a memory 1103. For example, the transceiver 1101 may be configured to transmit and receive signals. For example, the processor 1102 may be coupled to the transceiver 1101. For example, the memory 1103 may store instructions executable by the processor 1102 that, when executed by the processor 1102, cause the processor 1102 to perform the aforementioned method.

For example, the processor 1102 may be configured to (i) identify that LTE RAT of the terminal is disabled, (ii) determine whether each of the terminal and a target network supports VoNR before searching a NR cell, (iii) search the NR cell in case that the terminal and the target network support the VoNR, (iv) determine whether the NR cell supports the VoNR before registration to the NR cell, and (v) select a RAT other than the LTE RAT and a NR RAT to obtain a voice service in case that the NR cell does not support the VoNR.

While the UE is illustrated as having separate functional blocks for convenience of explanation, the configuration of the UE 1100 is not limited thereto. For example, the UE 1100 may include a communication unit consisting of a transceiver and a processor. The UE 1100 may communicate with at least one network node by means of the communication unit.

Figure 12:
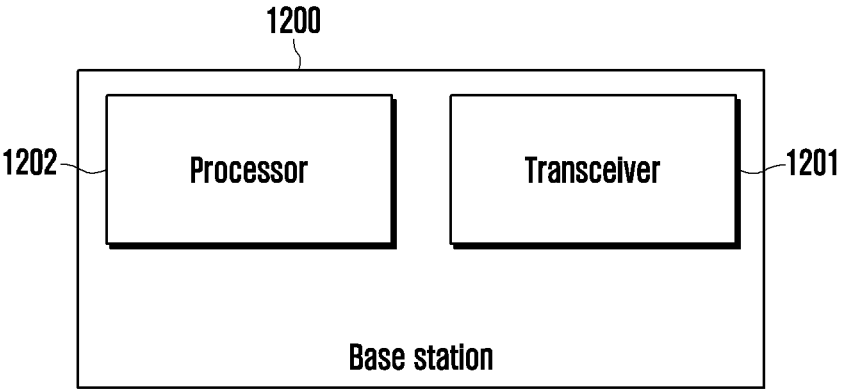
FIG. 12 illustrates a block diagram of a configuration of a BS according to an embodiment of the disclosure.

FIG. 12 illustrates a block diagram of a configuration of a base station according to an embodiment of the disclosure.

Referring to FIG. 12, a base station 1200 according to various embodiments of the disclosure may include a transceiver 1201 and a processor 1202. For example, the transceiver 1201 may be configured to transmit and receive signals. For example, the processor 1202 may be coupled to the transceiver 1201 and may perform the methods and/or embodiments described above.

According to an embodiment of the disclosure, when VoNR is not supported in a 5G SA deployment environment, but LTE RAT of the voice-centric terminal is disabled, available 3G/2G RAT for processing a voice service can be quickly determined.

In addition, according to an embodiment of the disclosure, it is possible to improve the emergency call success rate when VoNR is not supported in the 5G SA deployment environment, but LTE RAT of the voice-centric terminal is disabled.

In addition, according to an embodiment of the disclosure, when VoNR is not supported in a 5G SA deployment environment but LTE RAT of the voice-centric terminal is disabled, a roaming network for processing the voice service or an alternative voice service may be determined.

The effects obtainable in the disclosure are not limited to the above-mentioned effects, and other effects not mentioned herein will be clearly understood from the following description by those skilled in the art to which the disclosure belongs.

In addition, the methods according to the embodiments described in the claims or specifications of the disclosure may be implemented in the form of hardware, software, or a combination of hardware and software.

When implemented in software, a computer-readable storage medium storing one or more programs (software modules) may be provided. One or more programs stored in the computer-readable storage medium are configured to be executable by one or more processors in an electronic device. One or more programs include instructions for causing the electronic device to execute methods according to embodiments described in a claim or specification of the disclosure.

Such programs (software modules, software) may be stored in a random access memory, a non-volatile memory including flash memory, a read only memory (ROM), an electrically erasable programmable ROM (EEPROM), a magnetic disc storage device, a compact disc-ROM (CD-ROM), a digital versatile discs (DVDs), or any other form of optical storage device or a magnetic cassette. Alternatively, it may be stored in a memory including a combination of some or all thereof. In addition, each configuration memory may be included in plurality.

In the specific embodiments of the disclosure described above, elements included in the disclosure are expressed in the singular or plural according to the specific embodiments presented. However, the singular or plural expression is appropriately selected for the context presented for convenience of description, and the disclosure is not limited to the singular or plural element, and even if the element is expressed in plural, it is including the singular or singular. Even an expressed component may be including a plurality of components.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   identifying that long-term evolution (LTE) radio access technology (RAT) of the terminal is disabled;
   determining, before searching for a new radio (NR) cell of a target network, whether each of the terminal and the target network supports voice communication over new radio (VoNR) based on information stored in a database of the terminal;
   searching for the NR cell as a response to determining that the terminal and the target network support the VoNR;
   receiving a broadcast message on the NR cell;

obtaining a monitoring list including a parameter indicating a count value based on the broadcast message;

determining, before registering with the NR cell, whether the NR cell supports the VoNR based on the broadcast message; and selecting a RAT other than the LTE RAT and an NR RAT to obtain a voice service in case that the NR cell does not support the VoNR, wherein in case that the count value reaches a preconfigured maximum value, the NR cell is determined not to support the VoNR.

2. The method of claim 1, further comprising:

in case that the LTE RAT is disabled and the NR cell does not support the VoNR, blocking the NR RAT and camping on the selected RAT to obtain the voice service.

3. The method of claim 2, wherein in case that the LTE RAT is re-enabled or a usage setting of the terminal is changed from a voice centric to a data centric, the blocked NR RAT is re-enabled.

4. The method of claim 1, further comprising:

receiving a system information block (SIB) including a flag that indicates whether the NR cell supports the VoNR; and in case that the NR cell does not support the VoNR based on a value of the flag, blocking the NR RAT, storing frequency information associated with the NR RAT, and registering with the selected RAT.

5. The method of claim 1, wherein the monitoring list further includes a cell identifier (ID) associated with the NR cell, a public land mobile network (PLMN) and a tracking area code (TAC).

6. The method of claim 1, further comprising:

in case that the LTE RAT is disabled and the NR cell does not support the VoNR, identifying whether an additional voice service is available in the NR cell; and registering with the NR cell based on the additional voice service being available in the NR cell.

7. The method of claim 6, wherein the additional voice service includes at least one of voice over wireless fidelity (VoWiFi) or call and message continuity (CMC).

8. The method of claim 1, further comprising:

selecting one from among PLMNs stored in a subscriber identification module (SIM) memory in an order of equivalent PLMN (EPLMN), home PLMN (HPLMN), and operator PLMN (OPLMN);

determining whether the selected PLMN is associated with deactivation of the LTE RAT; and in case that the selected PLMN is associated with the deactivation of the LTE RAT, obtaining the voice service based on the VoNR.

9. The method of claim 1, further comprising:

in case that the NR cell supports the VoNR, camping on the NR cell to obtain the voice service.

10. A terminal in a wireless communication system, the terminal comprising:

a transceiver configured to transmit and receive signals;

memory, comprising one or more storage media, storing instructions; and at least one processor communicatively coupled to the transceiver and the memory, wherein the instructions, when executed by the at least one processor individually or collectively, cause the terminal to:

identify that long-term evolution (LTE) radio access technology (RAT) of the terminal is disabled, determine, before searching for a new radio (NR) cell of a target network, whether each of the terminal and the target network supports voice communication over new radio (VoNR) based on information stored in a database of the terminal, search for the NR cell as a response to determining that the terminal and the target network support the VoNR, receive a broadcast message on the NR cell, obtain a monitoring list including a parameter indicating a count value based on the broadcast message, determine, before registering with the NR cell, whether the NR cell supports the VoNR based on the broadcast message, and select a RAT other than the LTE RAT and an NR RAT to obtain a voice service in case that the NR cell does not support the VoNR, and wherein in case that the count value reaches a preconfigured maximum value, the NR cell is determined not to support the VoNR.

11. The terminal of claim 10, wherein the instructions, when executed by the at least one processor individually or collectively, further cause the terminal to:

block the NR RAT and camp on the selected RAT to obtain the voice service, in case that the LTE RAT is disabled and the NR cell does not support the VoNR.

12. The terminal of claim 11, wherein in case that the LTE RAT is re-enabled or a usage setting of the terminal is changed from a voice centric to a data centric, the blocked NR RAT is re-enabled.

13. The terminal of claim 10, wherein the instructions, when executed by the at least one processor individually or collectively, further cause the terminal to:

receive a system information block (SIB) including a flag that indicates whether the NR cell supports the VoNR, and in case that the NR cell does not support the VoNR based on a value of the flag, block the NR RAT, store frequency information associated with the NR RAT, and register with the selected RAT.

14. The terminal of claim 10, wherein the monitoring list further includes a cell identifier (ID) associated with the NR cell, a public land mobile network (PLMN) and a tracking area code (TAC).

15. The terminal of claim 10, wherein the instructions, when executed by the at least one processor individually or collectively, further cause the terminal to:

in case that the LTE RAT is disabled and the NR cell does not support the VoNR, identify whether an additional voice service is available in the NR cell, and register with the NR cell based on the additional voice service being available in the NR cell.

16. The terminal of claim 15, wherein the additional voice service includes at least one of voice over wireless fidelity (VoWiFi) or call and message continuity (CMC).

17. The terminal of claim 10, wherein the instructions, when executed by the at least one processor individually or collectively, further cause the terminal to:

select one from among PLMNs stored in a subscriber identification module (SIM) memory in an order of equivalent PLMN (EPLMN), home PLMN (HPLMN), and operator PLMN (OPLMN), determine whether the selected PLMN is associated with deactivation of the LTE RAT, and in case that the selected PLMN is associated with the deactivation of the LTE RAT, obtain the voice service based on the VoNR.

18. The terminal of claim 10, wherein the instructions, when executed by the at least one processor individually or collectively, further cause the terminal to:

in case that the NR cell supports the VoNR, camp on the NR cell to obtain the voice service.

\* \* \* \* \*